(12) United States Patent
Chin et al.

(10) Patent No.: US 6,968,692 B2
(45) Date of Patent: Nov. 29, 2005

(54) FUEL PREMIXING MODULE FOR GAS TURBINE ENGINE COMBUSTOR

(75) Inventors: Jushan Chin, Indianapolis, IN (US); Nader K. Rizk, Indianapolis, IN (US); Mohan K. Razdan, Indianapolis, IN (US); Andre W. Marshall, University Park, MD (US)

(73) Assignee: Rolls-Royce Corporation, Indianapolis, IN (US)

( * ) Notice: Subject to any disclaimer, the term of this patent is extended or adjusted under 35 U.S.C. 154(b) by 29 days.

(21) Appl. No.: 10/423,135

(22) Filed: Apr. 25, 2003

(65) Prior Publication Data

US 2004/0003596 A1 Jan. 8, 2004

Related U.S. Application Data

(60) Provisional application No. 60/375,897, filed on Apr. 26, 2002.

(51) Int. Cl.$^7$ .............................. F02C 1/00; F02G 3/00
(52) U.S. Cl. ........................... 60/737; 60/748; 431/182
(58) Field of Search .......................... 60/737, 732, 739, 60/740, 747, 748, 746, 742; 239/403–406; 431/182, 183

(56) References Cited

U.S. PATENT DOCUMENTS

| | | | | |
|---|---|---|---|---|
| 3,672,812 A | * | 6/1972 | Bendixen | 431/89 |
| 3,703,259 A | * | 11/1972 | Sturgess et al. | 239/400 |
| 3,764,071 A | | 10/1973 | Carlisle | |
| 3,912,164 A | | 10/1975 | Lefebvre et al. | |
| 3,946,552 A | * | 3/1976 | Weinstein et al. | 60/743 |
| 3,972,182 A | * | 8/1976 | Salvi | 60/743 |
| 4,050,879 A | * | 9/1977 | Takahashi et al. | 431/174 |
| 4,726,192 A | | 2/1988 | Willis et al. | |
| 4,842,197 A | * | 6/1989 | Simon et al. | 239/5 |
| 5,146,741 A | * | 9/1992 | Sood | 60/39.55 |
| 5,154,060 A | | 10/1992 | Walker et al. | |
| 5,218,824 A | * | 6/1993 | Cederwall et al. | 60/737 |
| 5,224,333 A | * | 7/1993 | Bretz et al. | 60/740 |
| 5,251,447 A | * | 10/1993 | Joshi et al. | 60/737 |
| 5,303,554 A | | 4/1994 | Faulkner | |
| 5,319,935 A | | 6/1994 | Toon et al. | |
| 5,351,477 A | * | 10/1994 | Joshi et al. | 60/39.463 |
| 5,373,693 A | * | 12/1994 | Zarzalis et al. | 60/39.23 |
| 5,490,389 A | * | 2/1996 | Harrison et al. | 60/737 |
| 5,515,680 A | * | 5/1996 | Fujimura et al. | 60/737 |
| 5,613,363 A | * | 3/1997 | Joshi et al. | 60/737 |
| 5,638,682 A | * | 6/1997 | Joshi et al. | 60/737 |
| 5,647,215 A | * | 7/1997 | Sharifi et al. | 60/737 |
| 5,647,538 A | * | 7/1997 | Richardson | 239/405 |
| 5,660,045 A | * | 8/1997 | Ito et al. | 60/737 |
| 5,675,971 A | * | 10/1997 | Angel et al. | 60/746 |
| 5,813,232 A | | 9/1998 | Razdan et al. | |
| 6,038,861 A | * | 3/2000 | Amos et al. | 60/737 |
| 6,068,470 A | * | 5/2000 | Zarzalis et al. | 431/187 |
| 6,070,411 A | * | 6/2000 | Iwai et al. | 60/737 |
| 6,082,111 A | * | 7/2000 | Stokes | 60/737 |
| 6,141,967 A | * | 11/2000 | Angel et al. | 60/737 |
| 6,272,840 B1 | | 8/2001 | Crocker et al. | |
| 6,311,496 B1 | | 11/2001 | Alkabie | |
| 6,334,309 B1 | * | 1/2002 | Dean et al. | 60/737 |
| 6,345,505 B1 | | 2/2002 | Green | |
| 6,363,726 B1 | | 4/2002 | Durbin et al. | |
| 6,367,262 B1 | | 4/2002 | Mongia et al. | |
| 6,381,964 B1 | * | 5/2002 | Pritchard et al. | 60/746 |

(Continued)

Primary Examiner—William H. Rodriguez
(74) Attorney, Agent, or Firm—Krieg Devault LLP (57) ABSTRACT

A fuel-air premixing module is designed to reduce emissions from a gas turbine engine. In one form, the premixing module includes a central pilot premixer module with a main premixer module positioned thereround. Each of the portions of the fuel-air premixing module include an axial inflow swirler with a plurality of fixed swirler vanes. Fuel is injected into the main premixer module between the swirler vanes of the axial inflow swirler and at an acute angle relative to the centerline of the premixing module.

28 Claims, 9 Drawing Sheets

U.S. PATENT DOCUMENTS

| | | | |
|---|---|---|---|
| 6,389,815 B1 * | 5/2002 | Hura et al. | 60/746 |
| 6,418,726 B1 * | 7/2002 | Foust et al. | 60/776 |
| 6,438,961 B2 | 8/2002 | Tuthill et al. | |
| 6,470,684 B2 | 10/2002 | Wilbraham | |
| 6,502,399 B2 | 1/2003 | Mandai et al. | |
| 6,532,726 B2 | 3/2003 | Norster et al. | |
| 2002/0011064 A1 | 1/2002 | Crocker et al. | |
| 2002/0112480 A1 | 8/2002 | McMillan et al. | |
| 2002/0162333 A1 * | 11/2002 | Zelina | 60/776 |
| 2002/0174656 A1 | 11/2002 | Hein | |
| 2002/0178726 A1 | 12/2002 | Carita et al. | |
| 2003/0010034 A1 | 1/2003 | Baudoin et al. | |
| 2003/0046936 A1 | 3/2003 | Oechsle et al. | |

* cited by examiner

FUEL PREMIXING MODULE FOR GAS TURBINE ENGINE COMBUSTOR

CROSS-REFERENCE TO RELATED APPLICATIONS

The present application claims the benefit of U.S. Provisional Patent Application No. 60/375,897 filed Apr. 26, 2002 and incorporated herein by reference.

The present invention was made under U.S. Government Contract NAS3-27725 awarded by NASA.

BACKGROUND OF THE INVENTION

The present invention relates generally to gas turbine engine combustors, and more particularly, in one form, to a gas turbine engine premixing module including a pilot premixing module surrounded by a main premixing module.

Air pollution emissions are an undesirable by-product from the operation of a gas turbine engine that burns fossil fuels. The primary air polluting emissions produced by the burning of fossil fuels include carbon dioxide, water vapor, oxides of nitrogen, carbon monoxide, unburned hydrocarbons, oxides of sulfur and particulate. Of the above emissions, carbon dioxide and water vapor are generally not considered objectionable. However, air pollution has become a worldwide concern and many nations have enacted stricter laws regarding the discharge of pollutants into the environment.

Gas turbine engine designers have generally accepted that many of the by-products of the combustion of a fossil fuel can be controlled by design parameters, the cleanup of exhaust gases and regulating the quality of fuel. Oxides of Nitrogen ($NO_x$) are one of the pollutants that have been of particular concern to gas turbine engine designers. It is well known that in a gas turbine engine the oxidation of nitrogen is dependent upon the flame temperature within the combustion region. Many gas turbine engines utilize some premixing of the main fuel with the compressor air to create a reactant mixture with lean stoichiometries to limit flame temperature and control $NO_x$ formation. Typically, a premixing section within the combustor prepares a combustible main fuel mixture upstream of the flame front, and therefore the combustor includes provisions to keep the flame from entering or igniting within the premixing section. Often the residence time and velocities within the premixing section are manipulated to discourage auto-ignition and flashback. As a result of this manipulation the residence time is many times limited, which results in incomplete mixing with increased $NO_x$ emission. Further, in many systems the burning temperatures are low enough that Carbon Monoxide (CO) emissions are increased.

Heretofore, there has been a need for an improved apparatus for forming a combustion mixture within a gas turbine engine. The present invention satisfies this and other needs in a novel and unobvious way.

SUMMARY OF THE INVENTION

One form of the present invention contemplates a mixing module, comprising: a pilot premixer including a first fuel dispenser and a first axial inflow swirler having a plurality of first vanes, the first axial inflow swirler disposed around at least a portion of the first fuel dispenser; and, a main premixer including a second fuel dispenser and a second axial inflow swirler having a plurality of second vanes, the main premixer positioned around at least a portion of the pilot premixer, the main premixer including a pair of fluid inlets, wherein one of the pair of fluid inlets is located upstream of the second axial swirler and positioned to allow the passage of a fluid into the second axial swirler and the other of the pair of fluid inlets is positioned to allow the passage of a fluid into the main premixer without passing through the second axial swirler, wherein the fluid entering the main premixer through the pair of fluid inlets is discharged through an outlet.

Another form of the present invention contemplates an apparatus for mixing gas and fuel, comprising: a premixer including a first axial inflow swirler having a first plurality of vanes, the premixer including a housing having a longitudinal centerline and a plurality of spaced fueling passages that are adapted to allow the discharge of fuel into the first axial inflow swirler, wherein the plurality of fueling passages are inclined at an acute angle with respect to the longitudinal centerline; and, a pilot premixer including a fuel dispenser and a second axial inflow swirler having a second plurality of vanes, the second axial inflow is swirler disposed around at least a portion of the fuel dispenser, and wherein the premixer is disposed around at least a portion of the pilot premixer.

Yet another form of the present invention contemplates a gas and fuel mixing module, comprising: a premixer including a first axial inflow swirler having a plurality of first fixed swirler vanes, the premixer including a casing having a longitudinal centerline and a plurality of spaced fueling passages formed in the casing to allow the discharge of fuel into the first axial inflow swirler, the premixer including a pair of fluid inlets, wherein one of the pair of fluid inlets is located upstream of the first axial swirler and allows the passage of gas into the first axial swirler and the other of the pair of fluid inlets allows the passage of gas into the premixer without passing through the first axial swirler, wherein the gas entering the main premixer through the pair of fluid inlets is discharged through an outlet, wherein the plurality of fueling passages are inclined at an acute angle with respect to the longitudinal centerline and directed towards the outlet; and, a pilot premixer including a fuel dispenser and a second axial inflow swirler having a plurality of second swirler vanes, the second axial inflow swirler disposed around at least a portion of the fuel dispenser, and wherein the premixer is disposed around at least a portion of the pilot premixer.

One object of the present invention is to provide a unique premixing module for a gas turbine engine.

Related objects and advantages of the present invention will be apparent from the following description.

DESCRIPTION OF THE PREFERRED EMBODIMENTS

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
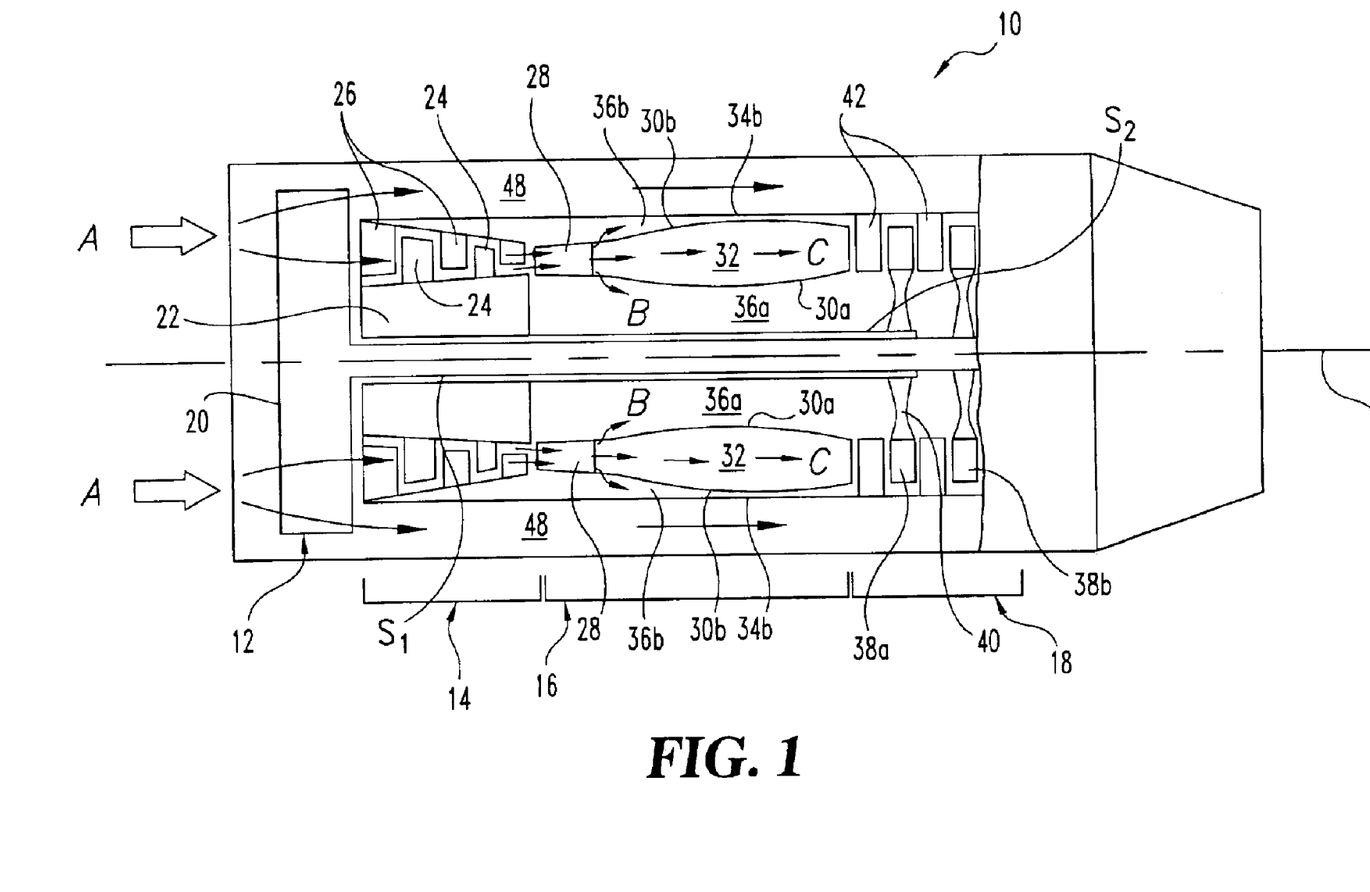
FIG. 1 is a schematic representation of a gas turbine engine.

With reference to FIG. 1, there is illustrated a schematic representation of a gas turbine engine 10. However, it should be understood that the invention described herein is applicable to all types of gas turbine engines, and is not intended to be limited to the gas turbine engine schematic represented in FIG. 1. The gas turbine engine 10 includes a longitudinal axis L extending generally along the working fluid flow path. Gas turbine engine 10 includes a fan section 12, a compressor section 14, a combustor section 16 and a turbine section 18 integrated to produce an aircraft flight propulsion engine generally referred to as a turbo-fan. Another form of a gas turbine engine includes a compressor section, a combustor section, and a turbine section integrated to produce an aircraft flight propulsion engine without a fan section.

It should be understood that the term "aircraft" is generic and is meant to include helicopters, airplanes, missiles, unmanned space devices, transatmospheric vehicles and other substantially similar devices. It is also important to realize that there are a multitude of ways in which the gas turbine engine components can be linked together to produce a flight propulsion engine. For instance, additional compressor and turbine stages could be added with intercoolers connected between the compressor stages. Additionally, although gas turbine engine 10 has been described for use with an aircraft, it should understood that engine 10 is equally suited to be used in industrial applications, such as, for example, pumping sets for gas and oil transmission lines, electricity generation, and naval propulsion. Further, a gas turbine engine has application in propelling motor vehicles.

The fan section 12 includes a fan 20 having a plurality of fan blades. A gaseous fluid is passed through fan 20 and fed into the compressor section 14. In one form of the present invention, the gaseous fluid is air. The multi-stage compressor section 14 includes a rotor 22 having a plurality of compressor blades 24 coupled thereto. The rotor 22 is affixed to a shaft SI which is rotatably mounted within gas turbine engine 10. A plurality of compressor vanes 26 are positioned adjacent the compressor blades 24 to direct the flow of the gaseous fluid through the compressor section 14.

Increased pressure fluid from the compressor section 14 is fed into the combustor section 16. In one form of the present invention, combustor section 16 includes a diffuser 28 and inner and outer combustor liners 30a, 30b coupled to diffuser 28 and spaced apart to define a combustion chamber 32. In one form of the invention, the liners 30a, 30b are spaced radially apart to define an annular combustor chamber; however, other combustor chamber configurations are also contemplated herein. Inner combustor liner 30a is spaced from an inner combustion case wall member 34a (FIG. 2) to define a fluid flow passage 36a. The outer combustor liner 30b is spaced from an outer combustion case wall member 34b to define a fluid flow passage 36b.

Turbine section 18 includes a plurality of turbine blades 38a coupled to a rotor 40a, which in turn is affixed to a drive shaft S$_2$ for transmitting rotational power to the compressor section 14. Turbine section 18 also includes a plurality of turbine blades 38b coupled to a rotor 40b, which in turn is affixed to shaft S$_1$ for transmitting rotational power to the fan section 12. A plurality of turbine vanes 42 are positioned adjacent the turbine blades 38a, 38b to direct the flow of the hot gaseous fluid stream generated by combustor section 16 through turbine section 18.

In operation, the turbine section 18 provides rotational power to shafts S$_1$ and S$_2$, which in turn drive the fan section 12 and the compressor section 14, respectively. A fluid such as, for example, air, enters the gas turbine engine 10 in the direction of arrows A, passes through fan section 12, and is fed into the compressor section 14 and a bypass duct 48. A substantial portion of the increased pressure air exiting compressor section 14 is routed into the diffuser 28. The diffuser 28 conditions the compressed air and directs portions of the conditioned air into the combustion chamber 32 and the annular fluid passages 36a, 36b in the direction of arrows B. The conditioned air entering the combustion chamber 32 is intermixed with fuel in a plurality of premixing modules 100 (FIG. 2) to provide a combustion mixture. In one non-limiting form of the present invention there are 12 to 20 premixing modules evenly spaced around the inlet end of the combustor. However, other quantities and spacing of premixing modules are contemplated herein. The combustion mixture is ignited and burned in combustion chamber 32 to generate the hot gaseous fluid stream.

The hot gaseous fluid stream flows through the combustion chamber 32 in the direction of arrows C. The fluid stream exits the aft end of the combustion chamber 32 where it is fed into the turbine section 18 to extract the energy necessary to power gas turbine engine 10. Further details regarding the general structure and operation of a gas turbine engine 10 are believed known to those skilled in the art and are therefore deemed unnecessary for a full understanding of the principles of the present invention.

Figure 2:
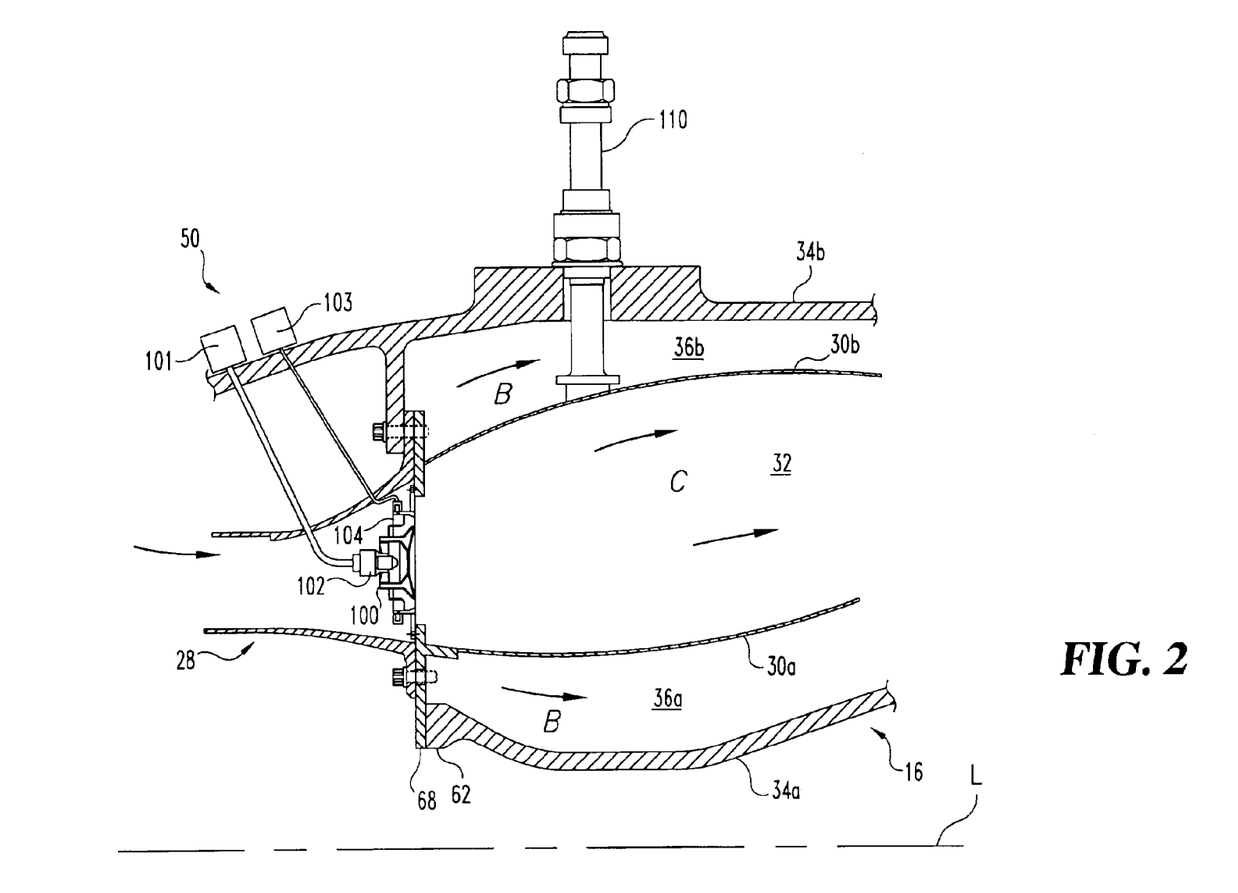
FIG. 2 is a sectional view of a portion of a gas turbine engine, illustrating an apparatus for forming a combustion mixture therein according to one form of the present invention.

Referring to FIG. 2, there is illustrated a cross sectional view of a portion of a non-limiting gas turbine engine including a combustor system 50 that is generally comprised of diffuser 28, inner and outer combustor liners 30a, 30b and the plurality of premixing modules 100. A fueling system 101 is disposed in fluid communication with a pilot premixer module 102 and a fueling system 103 is disposed in fluid communication with a main premixer module 104. The present invention contemplates that the fueling systems for delivering fuel to the pilot premixer module 102 and the main premixer module 104 can be combined or remain separate. Igniter 110 provides the source for ignition within the combustion chamber 32. In one form of the present invention the fuel is a liquid hydrocarbon fuel, however other fuels including gaseous fuels are contemplated herein. Further, the present invention will be described in terms of utilizing air and fuel for the combustion process, however other gases than air, such as the gas turbine engine exhaust are also contemplated herein. There is no intention to limit the present invention to the utilization of air unless specifically provided to the contrary. However, in order to aid the reader the description will be generally set forth-utilizing air.

Figure 3:
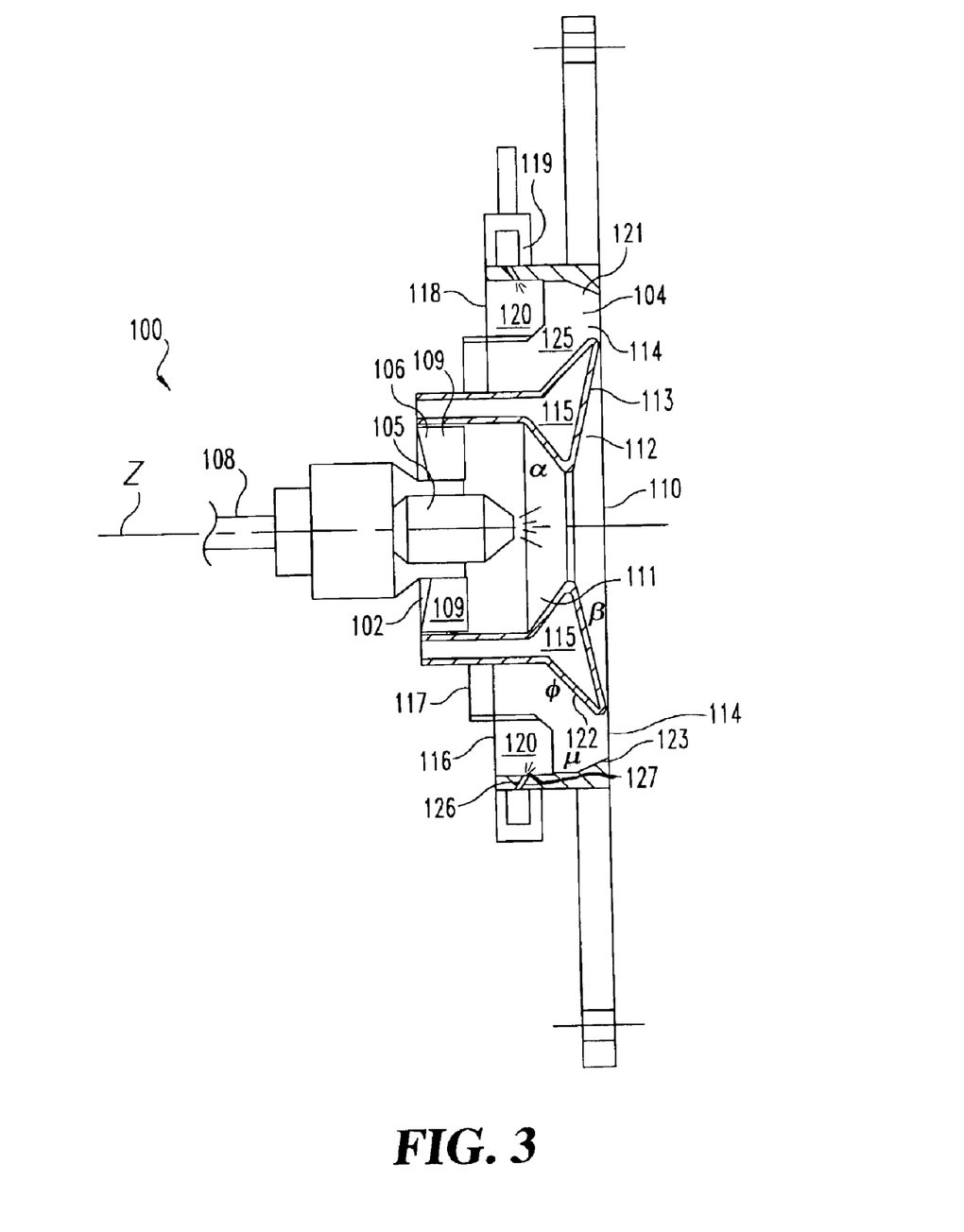
FIG. 3 is an enlarged view of the apparatus of FIG. 2 for forming a combustion mixture.

With reference to FIG. 3, there is illustrated an enlarged partially fragment sectional view of the premixing module 100. As discussed above the premixing module 100 includes the pilot premixing module 102 and the main premixing module 104. The main premixing module 104 is disposed around the pilot premixing module 102. The premixing module 100 includes a longitudinal centerline Z. In one form of the present invention the pilot premixing module 102 and the main premixing module 104 are concentric and the main premixing module 104 is located radially outward from the pilot premixing module 102.

The pilot premixing module 102 includes a fuel dispenser 105 that has a swirler 106 disposed around the fuel dispenser 105. The fuel dispenser 105 in one form is a fuel nozzle and more preferably is a pressure swirl fuel nozzle. Pressure swirl fuel nozzles atomize the fuel by injecting the fuel under pressure into the swirl chamber in the form of a thin film of fuel. Fuel line 108 provides a fuel flow path from the fueling system 101. However, it should be clearly understood that the present invention contemplated other types of fuel dispensers. The swirler 106 is an axial inflow swirler including a plurality of swirler vanes 109. Each of the swirler vanes 109 includes a leading edge, a trailing edge and a surface extending in the streamwise and spanwise directions. The swirler vanes 109 are preferably constructed of alloy steel which is capable of withstanding the compressor discharge temperature levels. In one form of the present invention the plurality of swirler vanes 109 are fixed and have substantially straight planer surfaces that define portions of the fluid flow path. However, the present invention contemplates swirler vanes having other surface geometry's. In one form of the present invention the number of swirler vanes 109 is 16 and these swirler vanes are spaced equally around the circumference of the swirler. However, axial inflow swirlers having other quantities of swirler vanes and spacing are contemplated herein.

The swirler vanes 109 have a swirl angle relative to direction of the longitudinal centerline Z. In one form of the invention the swirl angle is within a range of about 30° to about 35°. In another form of the present invention the swirl angle for the swirler vanes 109 is within a range of about 30° to about 32° and in another form the swirl angle is about 30°. However, other swirl angles are contemplated for the swirler vanes 109. The pilot premixing module 102 includes an exit aperture 110 for discharging the fuel and air mixture into the combustion chamber 32 and in one form the exit aperture has a substantially circular shape. In one form of the present invention the pilot premixing module 102 includes a converging fluid flow section 111 followed by a diverging fluid flow section 112. One embodiment of the present invention has the converging fluid flow section 111 with a half angle α of about 45° and the diverging fluid flow section 112 with a half angle β of about 75°. However, the present invention contemplates other half angles as required by a specific system design parameters. Further, in the embodiment of FIG. 3, the pilot premixing module 102 flow area is about ten percent of the total premixing module 100 flow area to provide a desired fuel/air ratio consistent with lean flame blowout design parameters. The present invention contemplates other ratios between the pilot premixing module flow area and the total premixing module flow area.

A separating member 113 is positioned between the pilot premixing module 102 and the main premixing module 104. The separating member 113 separates the fuel-air streams exiting the pilot exit aperture 110 and the main premixer exit aperture 114 to minimize the mixing of the two streams from the respective premixing modules 102 and 104. In one form of the present invention cooling air is pumped into the cavity 115 to cool the portions of the separating member 113 exposed to the flame in the combustion chamber 32. The present invention contemplates separating members having other sizes and shapes and that may be cooled or utilized in a non-cooled state.

The main premixing module 104 includes a swirler 118 and a fuel dispenser 119. The swirler 118 is preferably an axial inflow swirler having a plurality of swirler vanes 120. Each of the swirler vanes 120 includes a leading edge, a trailing edge and a surface extending in the streamwise and spanwise directions. The swirler vanes 120 are preferably constructed of alloy steel which is capable of withstanding the compressor discharge temperature levels. In one form of the present invention the plurality of swirler vanes 120 are fixed and have substantially straight planer surfaces that define portions of the fluid flow path. However, the present invention contemplates swirler vanes having other surface geometry's. In one form of the present invention the number of swirler vanes 120 is 9 and these swirler vanes are spaced equally around the circumference of the swirler. In another embodiment of the present invention the number of swirler vanes is 8 and these swirler vanes are spaced equally around the circumference of the swirler. However, axial inflow swirlers having other quantities of swirler vanes and spacing are contemplated herein.

The swirler vanes 120 have a swirl angle relative to direction of the longitudinal centerline Z. The swirl angle is preferably within a range of about 55° to about 70°. In one form of the present invention the swirl angle for the swirler vanes 120 is about 62° relative to the longitudinal centerline and there are nine swirler vanes. In another embodiment of the present invention the swirl angle for the swirler vane is about 60° relative to the longitudinal centerline and there are eight swirler vanes. However, other swirl angles are contemplated for the swirler vanes 120. The main premixing module 104 includes the main premixer exit aperture 114 for discharging the fuel and air mixture into the combustion chamber 32. In one form of the present invention the main premixing module 104 includes an internal fluid flow passageway with a converging fluid flow section 121. One embodiment of the present invention has an inner wall side 122 with a half angle $\phi$ of about 45° and an outer wall side 123 with a half angle $\mu$ of about 10° to about 15°. However, the present invention contemplates other half angles as required by a specific system design parameters. Further, in one form of the present invention the main premixer exit aperture 114 and the pilot premixer exit aperture 110 are located at the substantially the same axial location. However, an alternate embodiment of the present invention contemplates other relationships between the axial location of the respective exit apertures.

The main premixing module 104 includes a pair of fluid inlets 116 and 117. Each of the pair of fluid inlets is of an annular shape. Fluid inlet 116 is located upstream of the axial inflow swirler 118 and is positioned to allow the passage of the fluid into the axial inflow swirler 118. Fluid inlet 117 is positioned to allow the passage of fluid into the main premixer module 104 without passing through the axial inflow swirler 118. The fluid after passing through the repective inlet flows within an internal passageway 125 and is discharged through the main premixer exit aperture 114. In one form of the present invention there are utilized a plurality of radially extending supporting struts (not illustrated) to couple the main premixing module 104 with the pilot premixing module 102. One form of the present invention utilizes four supporting struts to couple the main premixing module 104 with the pilot premixing module 102. However, other quantities of supporting struts and ways of coupling the pilot premixing module 102 with the main premixing module are contemplated herein. In one form of the present invention the air passing through fluid inlet 116 is about sixty-five percent of the air flow within the main premixer module and the air passing through the inlet 117 is about thirty-five percent of the air flow within the main premixer module. However, other ratios between the air flows are contemplated herein.

The fuel dispenser 119 includes a plurality of spaced fuel passages 126 that are inclined at an acute angle relative to the longitudinal centerline Z. The acute angle is directed towards the main premixer aperture 114. In one form of the present invention the acute angle is about 45°, however other acute angles are contemplated herein. The spaced fuel passages 126 include a discharge end 127 that directs the fuel into the axial inflow swirler 118. The exposure of the injected fuel from the fuel passages 126 into the high speed fluid flowing through the axial inflow swirler 118 causes atomization of the fuel. In a preferred form the fuel injected through the fuel passages 126 is a liquid fuel.

Figure 4:
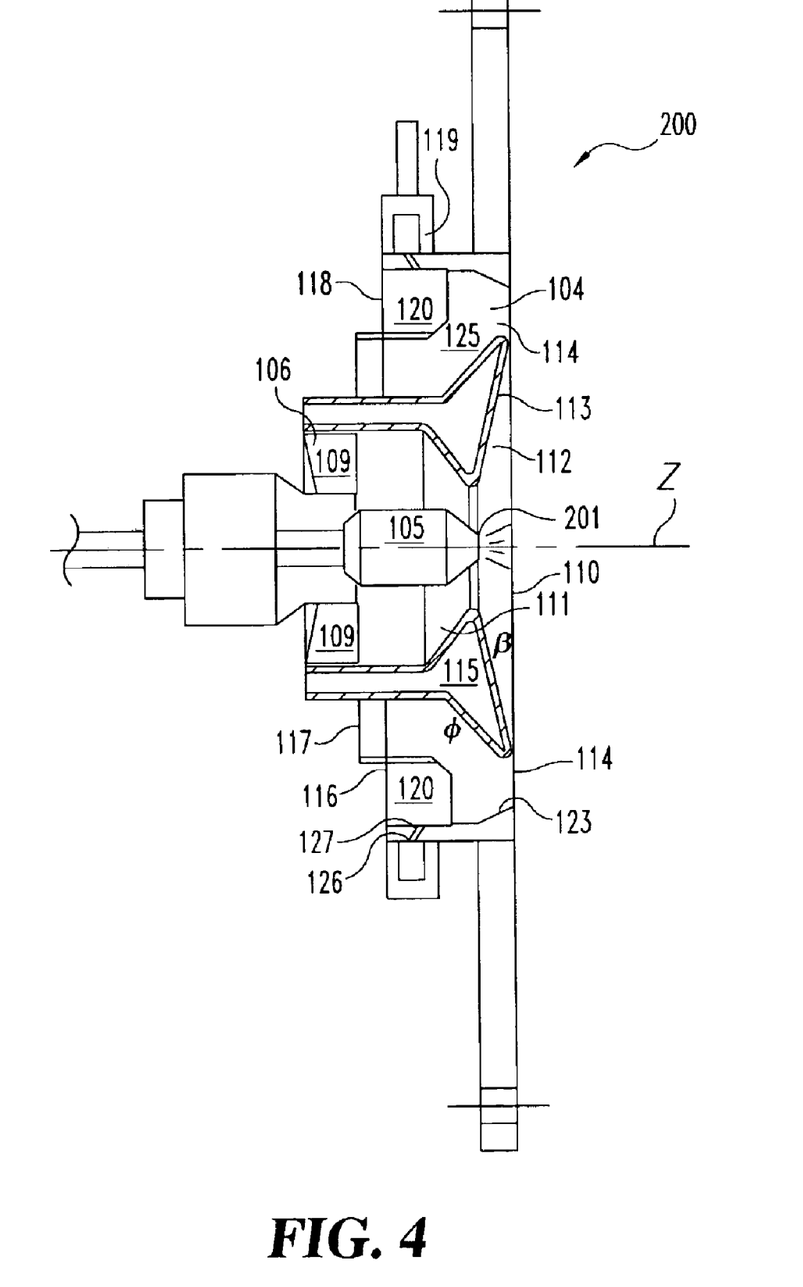
FIG. 4 is a view of an alternate embodiment of an apparatus for forming a combustion mixture of the present invention.

With reference to FIG. 4, there is illustrated an alternative fuel premixing module 200. The fuel premixing module 200 is substantially similar to the fuel premixing module 100. The substantial difference being the location of the pilot fuel dispenser outlet 201 is disposed axial closer to the pilot exit aperture 110. The fuel dispenser 105 has been positioned axially closer to the outlet 110. The reader should appreciate that like feature numbers will be utilized to represent like features and the description will not be repeated.

Figure 5:
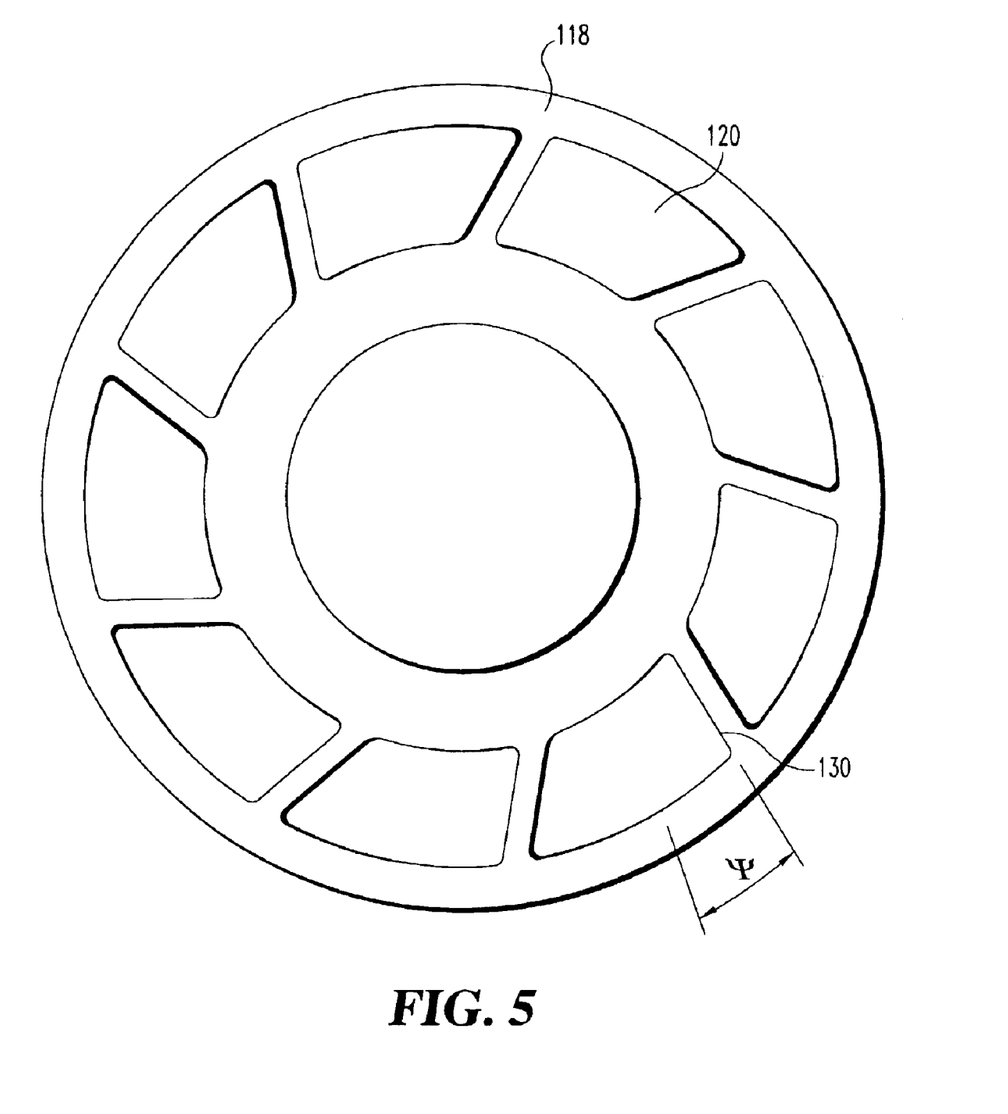
FIG. 5 is an end view of an axial swirler of the main premixer comprising a portion of one form of the apparatus for forming a combustion mixture of the present invention.

With reference to FIG. 5, there is illustrated an end view looking aft of the axial inflow swirler 118 including a plurality of equally spaced swirler vanes 120. In the embodiment set forth in FIG. 5, the plurality of swirler vanes are spaced apart 40° and the fuel discharge passages 126 are positioned at an angle ψ from the leading edge 130 of each of the swirler vanes 120. In one form of the present invention the angle ψ is about 25°. The fuel discharged from the fueling passages 126 is received within the channels defined between the plurality of swirling vanes 120. The air and fuel is mixed within the axial inflow swirler 118 as it passes between the plurality of swirler vanes 120. The present invention contemplates that the term mixing and mixture confer a broad meaning that includes partial and/or complete mixing unless specifically stated to the contrary.

Figure 6:
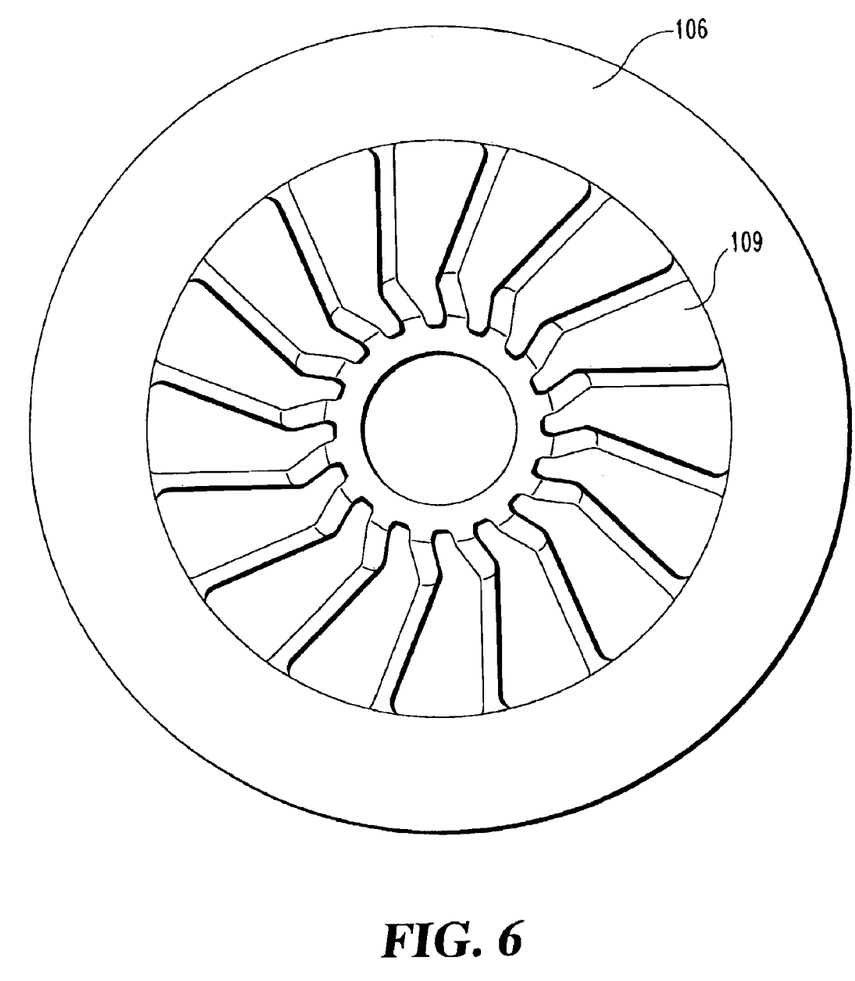
FIG. 6 is an end view of an axial swirler of the pilot premixer comprising a portion of one form of the apparatus for forming a combustion mixture of the present invention.

With reference to FIG. 6, there is illustrated an end view of the pilot axial inflow swirler 106. The axial inflow swirler includes a plurality of swirler vanes 109. The present invention contemplates embodiments wherein the fluid swirl direction in the pair of axial inflow swirlers could be in opposite directions (ex. clockwise and counter clockwise) or in the same direction. A preferred form of the present invention has the direction of swirl in the pilot axial inflow swirler 106 and the main swirler 118 in the same direction.

The premixing module of the present invention aims to solve the contradicting requirements between achieving low oxides of nitrogen ($NO_x$) emissions at higher engine power and avoiding lean blowout (flameout) at lower engine power and idle. In one form of the present invention the main premixing module admits about ninety percent of the entire premixing module air and about ninety percent of the fuel at high power, while the pilot premixing module admits the remaining about ten percent of the overall premixing module air and fuel flows. This combination limits the reaction temperature in both the pilot and main combustion zones and minimizes the formation of NOx emissions. At idle, the fuel is supplied only to the pilot premixing module thus forming a fuel rich pilot combustion zone that supports stable combustion and satisfactory margin for idle lean blowout performance. The radial separation between the pilot premixing module and the main premixing module shields the pilot flame from quenching due to the surrounding main module air.

The premixing module has efficient mixing of the fuel and air with the main premixing module thereby enabling the use of a short mixing length (less than 1.2 inches). This design eliminating the potential for pre-ignition of fuel/air mixture within the module. The convergent exit section of the main premixing module limits the flame from traveling upstream into the module body and causing hardware damage.

In one embodiment of the main premixing module the non-swirling flow accounts for about one third of the main air flow and the swirling flow accounts for about two-thirds of the main air flow. This combination provides for good control of the swirling flow at the exit of the main premixing module, maintains the flame position about one inch away from the main premixer module exit and enhances fuel/air mixing within the main premixing module before introducing the fuel/air mixture into the flame downstream of the main premixing module exit.

The fuel injection into the main premixing module is achieved through plain orifices. In one form of the invention the number of fuel delivery orifices is equal to the number of swirler vanes within the axial inflow swirler of the main premixing module. The fuel is delivered from the outer wall of the main premixing module at an angle towards the center of the module. The strong pressure gradient between the swirler vanes causes the liquid fuel jet to spread out rapidly in the circumferential direction.

Figure 7:
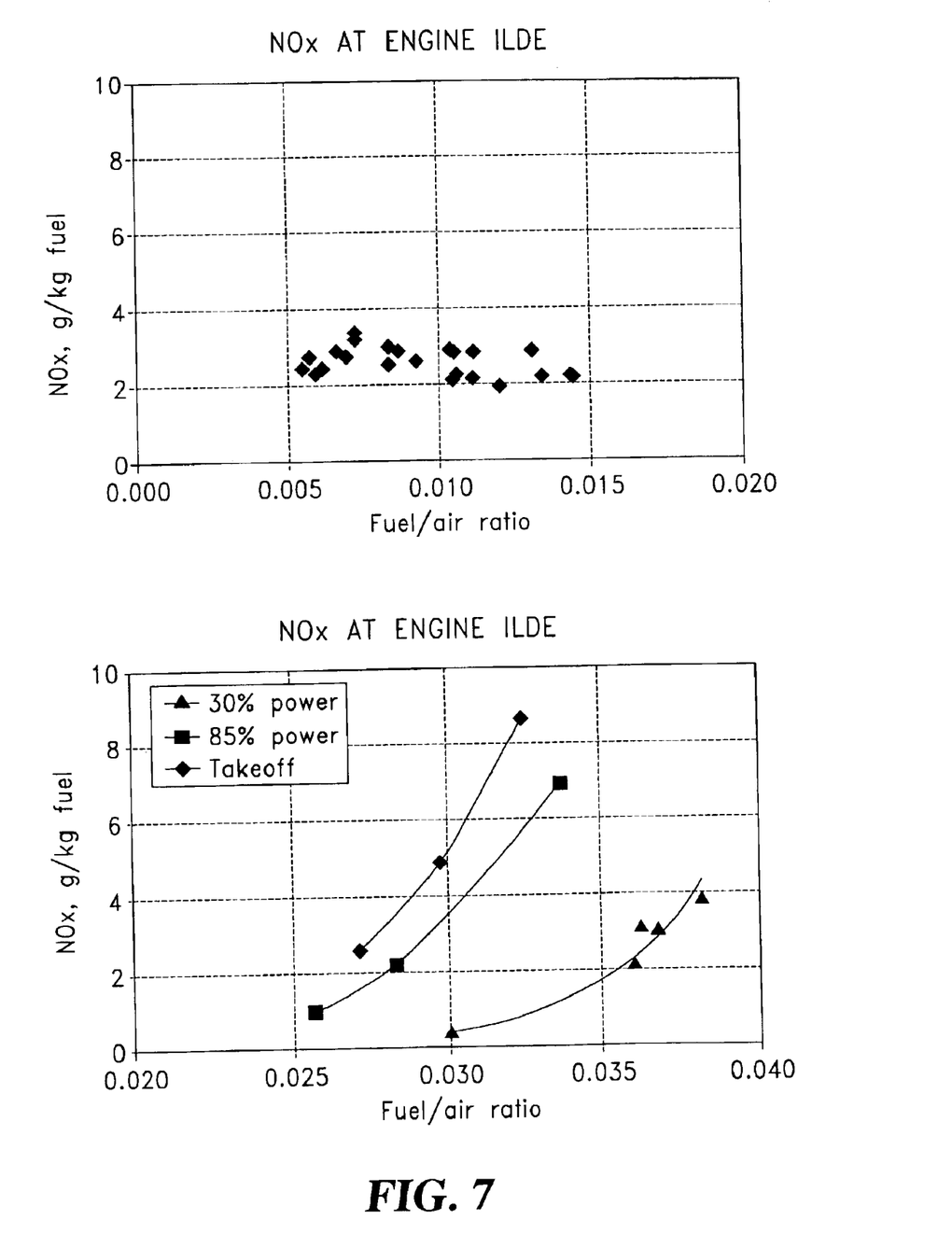
FIG. 7 is a plot of test results showing the NO$_x$ levels produced under a variety of conditions consistent with an aircraft's landing/takeoff power modes.
Figure 8:
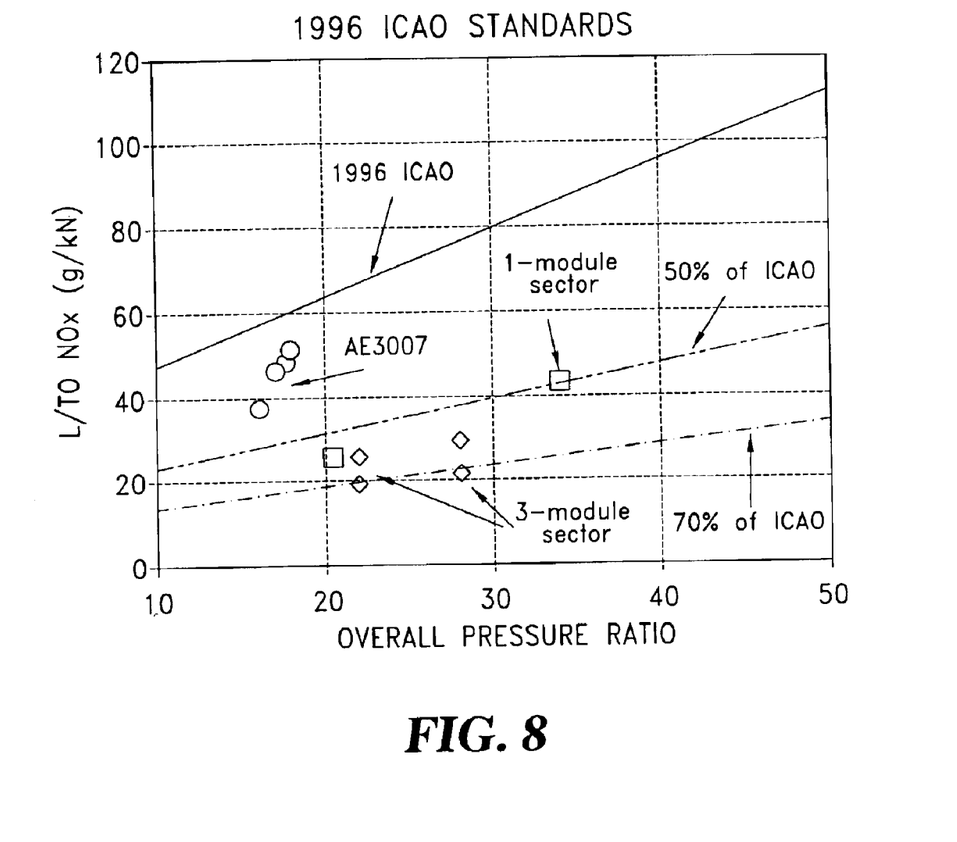
FIG. 8 is a plot of the estimated reduction in NO$_x$ below the 1996 International Civil Aviation Organization levels.
Figure 9:
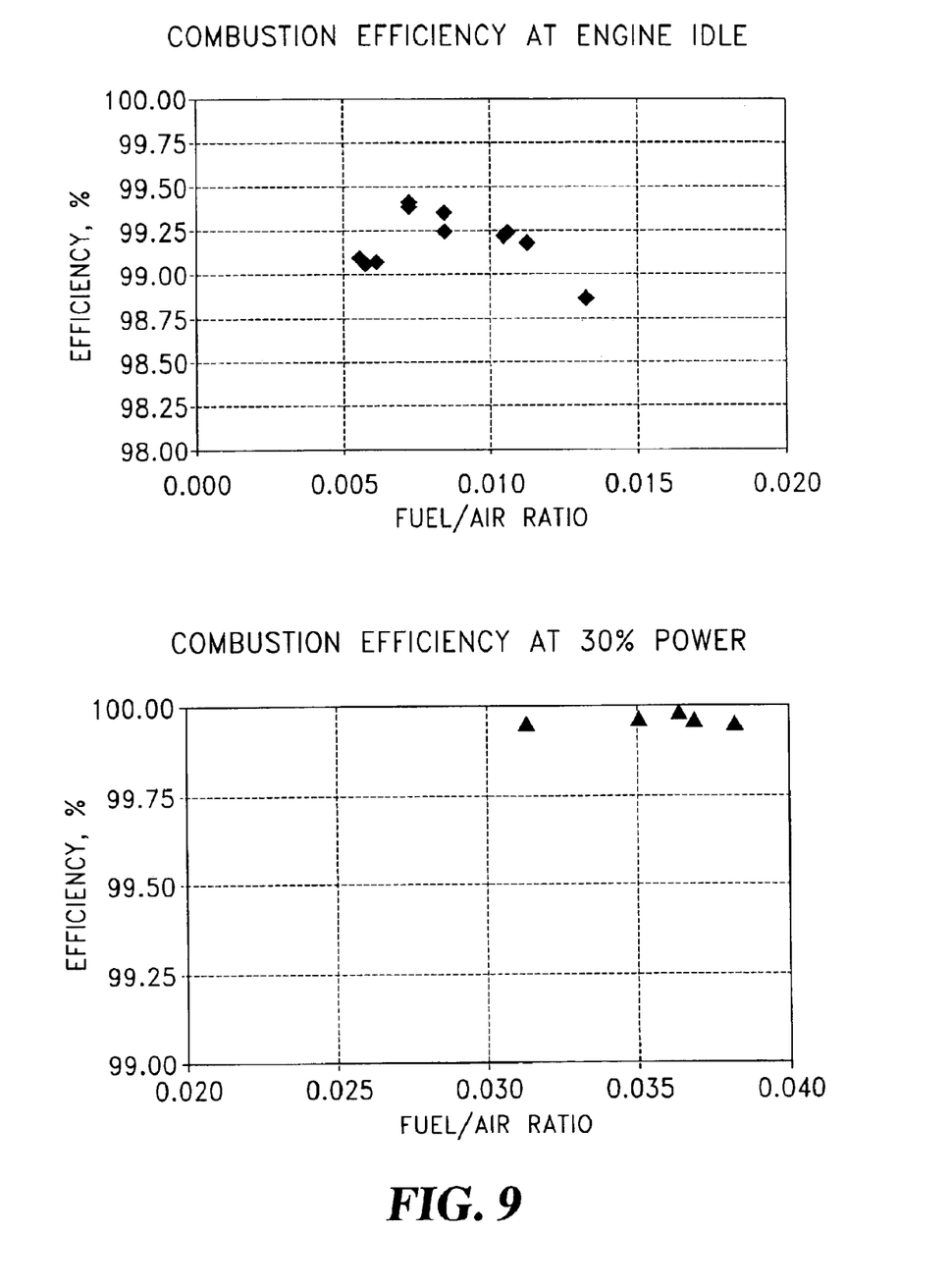
FIG. 9 is a plot of combustion efficiency.

With reference to FIGS. 7–9 there is presented test data from a combustor premixing module that was tested to demonstrate the present inventions capability to meet a target of reducing NOx emissions by fifty percent relative to the International Civil Aviation Organization (ICACO) regulations. FIG. 7 shows the NOx levels produced under a variety of conditions consistent with the aircraft landing/takeoff power modes. The total NOx emissions produced over the landing/takeoff cycle divided by takeoff engine thrust in KN is significantly below those of conventional engines of the time. FIG. 8 illustrates the estimated reduction in NOx emissions below the 1996 ICACO level. FIG. 9 illustrates that the combustion efficiency was ninety-nine percent and higher under all engine power conditions with an idle lean blowout fuel/air ratio of 0.004 or less.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary.

What is claimed:

1. A mixing module, comprising:

a pilot premixer including a first fuel dispenser and a first axial inflow swirler having a plurality of first vanes, said first axial inflow swirler disposed around at least a portion of said first fuel dispenser; and a main premixer including a second fuel dispenser and a second axial inflow swirler having a plurality of second vanes, said second fuel dispenser positioned to discharge a fuel for passage through at least a portion of said second axial inflow swirler, said main premixer positioned around at least a portion of said pilot premixer, said main premixer including a pair of fluid inlets, wherein one of said pair of fluid inlets is located upstream of said second axial swirler and positioned to allow the passage of a fluid into said second axial swirler and the other of said pair of fluid inlets is positioned to allow the passage of a fluid into said main premixer without passing through said second axial swirler, wherein the fluid entering the main premixer through said pair of fluid inlets is discharged through an outlet.

2. The module of claim 1, wherein said main premixer and said pilot premixer are substantially concentric.

3. The module of claim 2, wherein said pilot premixer comprises a longitudinal centerline;

wherein said pilot premixer comprises a pilot outlet; and which further comprises a separator disposed around the pilot premixer and extending between the pilot premixer and the main premixer to provides separation between said pilot outlet and said outlet.

4. The module of claim 3, wherein said first fuel dispenser is a pressure swirl fuel nozzle; and wherein said second fuel dispenser is positioned around said second axial inflow swirler, and wherein said main premixer includes a plurality of spaced fluid flow passages to allow the passage of fuel from said second fuel dispenser to said second axial inflow swirler.

5. The module of claim 4, wherein each of said plurality of spaced fluid flow passages includes a discharge opening that is located between an adjacent pair of said second vanes, and wherein each of said fluid flow passages is inclined at an acute angle with respect to said longitudinal centerline.

6. The module of claim 5, wherein said acute angle is about 45° and directed toward said outlet;

wherein each of said axial inflow swirlers is a fixed swirler;

wherein each of said plurality of first vanes is a straight blade; and wherein each of said plurality of second vanes is a straight blade.

7. The module of claim 6, wherein the swirl angle of the first axial inflow swirler relative to the longitudinal centerline is less than the swirl angle of the second axial inflow swirler relative to the longitudinal centerline.

8. The module of claim 1, wherein said pilot premixer and said main premixer are substantially concentric;

wherein each of said pair of fluid inlets is defined by an annular slot;

wherein said other of said pair of fluid inlets defines a non-swirl inlet and said one of said pair of fluid inlets defines a swirl inlet; and further wherein said non-swirl inlet has a flow area less than the flow area of said swirl inlet.

9. The module of claim 1, wherein said main premixer includes a housing with a fluid flow passageway disposed between said pair of fluid inlets and said outlet, and wherein said fluid flow passageway includes an exit portion that is convergent; and wherein said pilot premixer includes a passage in fluid communication with a pilot outlet, and wherein said passage includes an exit portion that is divergent.

10. The module of claim 1, wherein the mixing module includes a longitudinal centerline;

wherein said pilot premixer and said main premixer are substantially concentric;

wherein said pilot premixer includes a pilot outlet;

wherein said pilot outlet and said outlet are located at the substantial same axial position;

which further comprises separator means for providing separation between said pilot outlet and said outlet;

wherein said second fuel dispenser is disposed radially outward from said second axial inflow swirler; and wherein said second fuel dispenser includes a plurality of circumferentially spaced apertures to allow the passage of fuel from said second fuel dispenser to said second axial inflow swirler, each of said spaced apertures includes a discharge opening located between an adjacent pair of said second vanes, and wherein said fuel is discharged at an acute angle with respect to the longitudinal centerline.

11. The module of claim 10, wherein each of said pair of fluid inlets is defined by an annular slot;

wherein said other of said pair of fluid inlets defines a non-swirl inlet and said one of said pair of fluid inlets defines a swirl inlet, wherein said non-swirl inlet has a flow area less than the flow area of said swirl inlet;

wherein said main premixer includes a housing with a fluid flow passageway disposed between said pair of fluid inlets and said outlet, and wherein said fluid flow passageway includes an exit portion that is convergent; and wherein said pilot premixer includes a passage in fluid communication with said pilot outlet, and wherein said passage includes an exit portion that is divergent.

12. The module of claim 11, wherein said outlet is an annular ring;

wherein said pilot outlet has a substantially circular shape; and wherein each of said discharge openings is adapted to discharge the fuel into said second axial inflow swirler wherein the fuel is substantially atomized by the gas flowing through said second axial inflow swirler.

13. An apparatus for mixing gas and fuel, comprising:

a premixer including a first axial inflow swirler having a first plurality of vanes, said premixer including a housing having a longitudinal centerline and a plurality of spaced fueling passages that allow the discharge of fuel into said first axial inflow swirler, wherein said plurality of fueling passages are inclined at an acute angle with respect to said longitudinal centerline; and a pilot premixer including a fuel dispenser and a second axial inflow swirler having a second plurality of vanes, said second axial inflow swirler disposed around at least a portion of said fuel dispenser, and wherein said premixer is disposed around at least a portion of said pilot premixer.

14. The apparatus of claim 13, wherein said premixer and said pilot premixer are disposed concentrically about said longitudinal centerline; and wherein said plurality of spaced fueling passages are located radially outward from said first axial inflow swirler.

15. The apparatus of claim 14, wherein said premixer includes a pair of fluid inlets spaced axially from a fluid outlet, and wherein each of said plurality of fueling passages are directed substantially towards said fluid outlet.

16. The apparatus of claim 15, wherein said acute angle is about 45° relative to said longitudinal centerline; and wherein said fuel dispenser is a pressure swirl atomizer fuel nozzle.

17. The apparatus of claim 14, wherein said premixer includes a premixer outlet and said pilot premixer includes a pilot outlet; wherein said premixer outlet and said pilot outlet are separated a radial distance by a separating member to minimize mixing of the fluid streams from said premixer outlet and said pilot outlet.

18. The apparatus of claim 17, wherein said premixer includes a fluid flow passageway within said housing, and wherein said fluid flow passageway includes an exit portion that is convergent.

19. The apparatus of claim 16 wherein said premixer includes a premixer outlet and said pilot premixer includes a pilot outlet;

wherein said premixer outlet and said pilot outlet are separated a radial distance by separating means for minimizing the mixing of the fluid streams exiting from said premixer outlet and said pilot outlet; and wherein said premixer includes a fluid flow passageway disposed within said housing, and wherein said fluid flow passageway includes an exit portion that is convergent.

20. The apparatus of claim 19, wherein each of said first plurality of vanes and said second plurality of vanes are substantially flat; and wherein said premixer outlet and said pilot outlet are disposed at about the same axial location.

21. A gas and fuel mixing module, comprising:

a premixer including a first axial inflow swirler having a plurality of fixed first swirler vanes, said premixer including a casing having a longitudinal centerline and a plurality of spaced fueling passages formed in said casing to allow the discharge of fuel into said first axial inflow swirler, said premixer including a pair of fluid inlets, wherein one of said pair of fluid inlets is located upstream of said first axial swirler and allows the passage of gas into said first axial swirler and the other of said pair of fluid inlets allows the passage of gas into said premixer without passing through said first axial swirler, wherein the gas entering the premixer through said pair of fluid inlets is discharged through an outlet, wherein said plurality of fueling passages are inclined at an acute angle with respect to said longitudinal centerline and directed towards said outlet; and a pilot premixer including a fuel dispenser and a second axial inflow swirler having a plurality of fixed second swirler vanes, said second axial inflow swirler disposed around at least a portion of said fuel dispenser, and wherein said premixer is disposed around at least a portion of said pilot premixer.

22. The module of claim 21, wherein said premixer and said pilot premixer are substantially concentric about said longitudinal centerline;

which further includes a member disposed around said pilot premixer and extending between said pilot premixer and said premixer;

said pilot premixer including a pilot outlet; and wherein said member extending substantially between said pilot outlet and said outlet.

23. The module of claim 21, wherein each of said fueling passages include a discharge opening located between a pair of said first fixed swirler vanes;

wherein said premixer and said pilot premixer are substantially concentric about said longitudinal centerline;

wherein each of said pair of fluid inlets is an annular ring;

wherein said outlet is an annular ring; and wherein said pilot premixer includes a pilot outlet having a circular shape.

24. The module of claim 21, wherein each of said fuel passages is adapted to discharge the fuel into said first axial inflow swirler wherein the fuel is substantially atomized by the gas flowing through said first axial inflow swirler.

25. The module of claim 21, wherein said pilot premixer includes a pilot outlet; and wherein said outlet and said pilot outlet are located at the substantially same axial position along said longitudinal centerline.

26. The module of claim 21, wherein said premixer and said pilot premixer are substantially concentric about said longitudinal centerline;

which further includes a separating member disposed around said pilot premixer and extending between said pilot premixer and said premixer;

said pilot premixer including a pilot outlet having a circular shape;

wherein each of said fueling passages include a discharge opening located between a pair of said first fixed swirler vanes;

wherein each of said pair of fluid inlets-is an annular ring;

wherein said outlet is an annular ring; and wherein said outlet and said pilot outlet are located at the substantially same axial position along said longitudinal centerline.

27. The apparatus of claim 26, wherein said first axial inflow swirler defines a first swirl angle and said second axial inflow swirler defines a second swirl angle, and wherein said first swirl angle is greater than said second swirl angle.

28. The apparatus of claim 27, wherein said first swirl angle is about 62° and said second swirl angle is about 30°;

wherein said plurality of first fixed swirler vanes defines nine equally spaced flat members; and wherein said plurality of second fixed swirler vanes defines 16 equally spaced flat members.

* * * * *